United States Patent
Pitchon

[15] 3,644,123
[45] Feb. 22, 1972

[54] PROCESS FOR REMOVING DELETERIOUS ACID COMPONENTS FROM STEAMED COFFEE

[72] Inventor: Esra Pitchon, Flushing, N.Y.
[73] Assignee: General Foods Corporation, White Plains, N.Y.
[22] Filed: Nov. 19, 1969
[21] Appl. No.: 878,227

[52] U.S. Cl. ...................................................99/71
[51] Int. Cl. ...............................................A23f 1/08
[58] Field of Search ...............................99/65, 71

[56] References Cited

UNITED STATES PATENTS 3,420,674  1/1969  McCartney...............................99/71

OTHER PUBLICATIONS

Sivetz, Coffee Processing Technology, Vol. 2, 1963, pp. 85–91.

Primary Examiner—Frank W. Lutter
Assistant Examiner—William L. Mentlik
Attorney—Gerald E. Jacobs, Bruno P. Struzzi and Thomas V. Sullivan

[57] ABSTRACT

Roasted and ground coffee is subjected to a dearomatization, steaming operation prior to percolation of the coffee. The flow of extract in the percolators is then controlled such that it passes through the steamed coffee and then through a bed of unsteamed coffee. The unsteamed coffee deacidifies the extract which contains acids picked up from the steamed coffee.

7 Claims, No Drawings

PROCESS FOR REMOVING DELETERIOUS ACID COMPONENTS FROM STEAMED COFFEE

CROSS REFERENCE TO RELATED APPLICATIONS

"New and Improved Soluble Coffee Process" by Mansky et al., filed Nov. 10, 1969, Ser. No. 875,497.

BACKGROUND OF THE INVENTION

This invention is for a method of treating roasted and ground coffee in an extraction process whereby deleterious acids formed by steaming coffee are removed. More particularly, it pertains to the use of fresh roasted and ground, unsteamed coffee as a medium for reducing the undesirable acids in coffee extract obtained when extracting steamed coffee.

Many soluble coffee processes have been developed wherein volatile aromatic constituents are removed and recovered at different points in the coffee process. These volatiles are collected and added back to either the coffee extract prior to drying, or to the dry soluble solids in order to enhance the flavor of the soluble coffee product. Many of these processes use the roasted and ground coffee which is to be extracted in a standard percolator operation as the source of the aromatic volatiles. The ground coffee is subjected to a steaming operation and the vapors drawn off contain the desired volatile material. This steaming may be done under atmospheric conditions, under vacuum, or under elevated pressures depending upon which process is being used.

One of the undesirable side effects of steaming is the development of acids which find their way into the coffee extract when the steamed, roasted and ground coffee is subjected to percolation. Several techniques have been suggested in the past for neutralizing or removing these undesirable acids. Thus, one of the older techniques is to neutralize the acids chemically. This approach is apparently undesirable as the salty byproducts produced have an undesirable effect on the flavor of the coffee. In U.S. Pat. No. 3,420,674 a technique for treating coffee which has been subjected to atmospheric steaming is disclosed and claimed. The process therein described involves subjecting the steamed coffee to a vacuum operation in order to vaporize the acids and remove them in a vapor form.

While such a process apparently works it is also apparently restricted to use of coffees which are atmospherically steamed and may not be effective if the coffee is initially subjected to vacuum steaming.

SUMMARY OF THE INVENTION

It has now been discovered that fresh roasted and ground coffee can be utilized as a medium for removing the undesirable acids from coffee extract obtained by subjecting steamed coffee to a percolation operation. In a standard percolation operation this invention is utilized by subjecting only part of the fresh coffee loaded into a percolator column to a steaming operation. The remainder of the coffee in the percolator is unsteamed ground coffee. When this percolator containing steamed and unsteamed coffees is put on steam, the flow of extract through the column is controlled such that the extract first passes through the steamed coffee fraction and then through the unsteamed coffee fraction.

It has been found that by practicing the process of this invention the acidity of the extract is significantly reduced, to a level approaching that normally obtained when extracting unsteamed coffee in a percolator operation. The change in acidity is readily detected in the final product and the lower acid coffee obtained by the process of this invention is much preferred.

DESCRIPTION OF THE PREFERRED EMBODIMENT

Soluble coffee is normally produced commercially by subjecting roasted and ground coffee to water extraction in a set of percolators to obtain coffee extract containing soluble coffee solids. Extract may then be further treated or directly subjected to a drying operation.

The standard percolation operation is performed in a battery of columns called percolators. The operation is counter-current in that water is pumped into the column containing the most spent or extracted grounds and is drawn off as an extract from the column containing the least extracted or fresh ground coffee.

When using a steaming operation to obtain desired aromatic volatiles, the fresh coffee is steamed before it is subjected to extraction in a percolator. One such steam distillation treatment is described in U.S. Pat. No. 3,132,947, wherein the roasted and ground coffee is subjected to steaming at atmospheric pressure. There are many other patents which describe steaming techniques which are performed under vacuum conditions or under pressure.

In practicing the process of this invention the coffee may be steamed by any of the prior art processes. Also, the coffee may be steamed in the percolator column or in a separate vessel prior to loading it into the percolator column. The key to the success of this operation is to place a charge of steamed, roasted and ground coffee in such a position that when the percolator column containing the steamed coffee is subjected to extraction, the flow of the extract will pass through the steamed coffee and then through unsteamed coffee.

Thus, a percolator column can be partially filled with coffee which has been subjected to a steaming operation followed by a charge of unsteamed coffee to completely fill the percolator column. When this loaded column is then put on stream in the extraction operation, extract will be fed into the column at the bottom of the column, so that it will pass through and extract the steamed coffee before it reaches and extracts solids from the unsteamed coffee. It has been found, that by following the process of this invention, the pH of the extract may be increased from about 4.7 to almost 4.9. The pH of extract obtained from a percolator set wherein none of the coffee has been steamed was about 4.9, when processing a particular blend of coffees. When this same blend of coffees has been subjected to a steaming operation the pH is found to be about 4.7 due to the increase of undesirable acids formed during the steaming operation. Thus, it is readily apparent that by practicing the process of this invention the acidity of the coffee is returned to a normal level with no added equipment being necessary to accomplish this desirable goal. The flavor of the extract and of the dry solids obtained from the extract is significantly changed with a change in pH of as little as 0.05 to 0.10, with the lower acid (higher pH) extract being significantly preferred. When practicing the process of this invention the extract obtained is equally preferred to extract produced when unsteamed coffee is percolated, while the extract obtained from steamed coffee is significantly different than and less preferred than extract obtained from unsteamed coffee.

The process of this invention may also be practiced by partially loading a percolator column with unsteamed coffee and then filling the column with coffee which has been steamed. When loading the column in the foregoing manner, the flow of extract through the column will be from the top of the column down through the column and out of the bottom such that it will first pass through the steamed coffee and then through the unsteamed coffee.

An alternate to steaming coffee prior to loading the percolator column would be to partially load a percolator column with fresh coffee, subject the partially loaded column to a steaming operation and then complete the column loading with unsteamed coffee. The flow of extract in this instance would be from the bottom of the column up through the column and out of the top so that the extract first contacted the steamed coffee and then the unsteamed coffee.

It has also been found that a percolator column may be completely loaded and then subjected to a steaming operation by introducing the steam at some point in the column between the top and the bottom and drawing off the steam and aromatic volatiles either at the top or at the bottom of the column. In this manner only that portion of the bed between the steam inlet and the point of drawoff is subjected to a steaming operation and the remaining portion of the bed is used to deacidify the extract. Obviously, if the upper portion of the bed is subjected to steaming, the flow of extract will be from the top of the percolator down through the column and out the bottom. If the bottom portion of the bed has been steamed the flow of extract will be from the bottom of the column up through the column and out the top.

In a copending application by Mansky et al., a unique percolation process is described wherein two fresh columns are put on stream. A double drawoff is taken from one of these two columns. The process of this invention is applicable to such a percolation technique by subjecting one of the two columns to a steaming operation using the unsteamed column as the column from which the double drawoff is taken. In this manner, the extract first passes through the column containing the steamed coffee and then through the column containing the unsteamed coffee.

The process of this invention was demonstrated by the following example:

A battery of six percolator columns was used in a standard percolation operation to produce coffee extract. The extract obtained during equilibrium conditions was found to have a pH of about 4.9.

The process was then continued but with the added step of subjecting the coffee in the fresh column to a steaming operation wherein all of the coffee in the column was steamed before extract was allowed to flow through the column. It was found that the extract obtained had a pH of about 4.7 and was significantly less preferred than the extract obtained from unsteamed coffee.

The run was then continued with the following modification:

Steam was introduced into the loaded fresh stage at a point one-third down from the top of the column; and a slight vacuum was applied at the top of the column to direct the vapors up through the top one-third of the coffee in the column. After steaming, the extract flow through this column was in a downward direction from the top to the bottom of the column. It was found that the extract obtained using this technique (the process of this invention) had a pH of greater than 4.8 and usually greater than 4.85. The extract thus obtained was significantly preferred over the extract obtained when using a column containing only steamed coffee and was considered by expert tasters as essentially equivalent to extract obtained from the unsteamed coffee. The quantity of aromatics obtained via partial column steaming was sufficient to impart an enhanced flavor when added back to the extract.

Having thus described the process of this invention it is intended to be limited and defined by the appended claims.

What is claimed is:

1. A process for removing the deleterious acid components of coffee extract obtained from roasted coffee which has been subjected to steaming for removal of volatile aromas and for producing an extract which is essentially equivalent to extract obtained solely from unsteamed beans comprising: passing an extracting medium through a bed of said steamed coffee to obtain a coffee extract containing soluble solids extracted from said steamed coffee, said extract containing deleterious acids formed during the steaming; passing said coffee extract through a bed of roasted coffee which has not been steamed, said extract being enriched by soluble solids extracted from the unsteamed roasted coffee and said unsteamed coffee filtering out deleterious acids picked up from the steamed coffee.

2. The process of claim 1 wherein the steamed roasted coffee is transferred to a percolation column such that the bottom portion of the percolator column is filled with steamed coffee; the upper portion of the percolator column is then filled with unsteamed roasted coffee and the extracting medium is fed through the percolator column from the bottom to the top of said column.

3. The process of claim 2 wherein the percolator column is filled with unsteamed coffee; steam is introduced into the column of roasted coffee at the bottom of the column; the steam containing volatiles being drawn off at a point between the bottom and top of said percolator column; after steaming the extracting medium being fed through the percolator column from the bottom to the top of said column.

4. The process of claim 1 wherein the bottom portion of a percolator column is filled with unsteamed roasted coffee; the top portion of the percolator column is filled with steamed roasted coffee and the extracting medium is fed through the percolator column from the top to the bottom of said column.

5. The process of claim 1 wherein a percolator column is filled with unsteamed roasted coffee; steam is introduced into the column of roasted coffee at a point between the top and bottom of the percolator column; the steam containing coffee volatiles being drawn off at the top of said percolator column; after steaming the extracting medium being fed through the percolator column from the top to the bottom of said column.

6. The process of claim 1 wherein a percolator column is filled with unsteamed roasted coffee; steam is introduced into the column of roasted coffee at a point between the top and bottom of the percolator column; the steam containing coffee volatiles being drawn off at the bottom of said percolator column; after steaming the extracting medium being fed through the percolator column from the bottom to the top of said column.

7. The process of claim 1 wherein the percolator column is filled with unsteamed roasted coffee; steam is introduced into the column of roasted coffee at the top of the column; the steam containing coffee volatiles being drawn off at a point between the top and bottom of the said percolator column; after steaming the extracting medium being fed through the percolator column from the top to the bottom of said column.

* * * * *